United States Patent [19]

Nakakuki

[11] Patent Number: 5,587,746
[45] Date of Patent: Dec. 24, 1996

[54] IMAGE SIGNAL PROCESSOR FOR OBTAINING DIGITAL IMAGE SIGNALS

[75] Inventor: Toshio Nakakuki, Gifu-ken, Japan

[73] Assignee: Sanyo Electric Co., Ltd., Osaka, Japan

[21] Appl. No.: 493,448

[22] Filed: Jun. 22, 1995

[30] Foreign Application Priority Data

Jun. 24, 1994 [JP] Japan ................................. 6-143342

[51] Int. Cl.$^6$ ................................. H04N 5/04; H04N 5/14
[52] U.S. Cl. ........................ 348/708; 348/720; 348/571; 348/500
[58] Field of Search ................................. 348/708, 711, 348/717, 720, 722, 230, 237, 241, 266, 272, 500, 571, 725; H04N 5/04, 5/14

[56] References Cited

U.S. PATENT DOCUMENTS 5,291,276  3/1994  Matsumoto et al. ................. 348/708
5,323,237  6/1994  Oda ........................................... 348/708
5,331,411  7/1994  Kawakami et al. ..................... 348/708

Primary Examiner—John K. Peng
Assistant Examiner—Glenton B. Burgess
Attorney, Agent, or Firm—Loeb & Loeb LLP

[57] ABSTRACT

An analog image signal is converted into a digital image signal which is in turn subjected to various types of processing procedures. The resulting digital image data is added to synchronizing data having the same range of data change as that of the image data to generate image data containing the synchronizing data. This image data is then converted into an analog image signal. An offset signal is applied to the analog image signal to adjust the voltage level of the synchronizing signal for obtaining an image signal containing a correct synchronizing signal.

9 Claims, 8 Drawing Sheets

IMAGE SIGNAL PROCESSOR FOR OBTAINING DIGITAL IMAGE SIGNALS

BACKGROUND OF THE INVENTION

1. Field of the Invention

The present invention relates to an image signal processor for treating image signals from an image sensor as digital data.

2. Description of the Prior Art

In general, a composite video signal for color image is obtained by subjecting color component signals (R, G and B) representing three primary colors of red, green and blue to color difference matrix, balanced adjustment and so on. These processes are carried out by such an image signal processor as shown in FIG. 1, which is called a "color encoder".

A color separation circuit 1 is adapted to break down image signals (Y1), including color components of three primary colors (or combinations with their complementary colors) repeated in a given sequence, to the respective components in order to generate independent color component signals (R, G and B). The image signals (Y1) are provided by the outputs of an image sensor which may include a color filter comprising red-, green- and blue-color filters arranged in a mosaic and have a vertical scan cycle formed by a predetermined number of horizontal scan lines and a horizontal scan cycle formed by a predetermined number of image data. A white balance adjustment circuit 2 is adapted to provide a gain inherent in the respective one of the color component signals (R, G and B) to equalize the average level of each of the color component signals (R, G and B) such that the white color of a white-colored object can be reproduced on a reproduced scene. The white balance adjustment circuit 2 may be feedback controlled to approximate the integrated values of color difference signals (R–Y and B–Y), which will be described later, to predetermined values. A color difference matrix circuit 3 receives three types of color component signals (R, G and B) from the white balance adjustment circuit 2 and combines these color components in a given proportion (R:30%, G:59% and B:11%) to generate a brightness signal (Y:Y=0.3R+0.59G+0.11B). The circuit 3 is further adapted to subtract the brightness signal (Y) from two color component signals (R and B), in order to generate two types of color difference signals (R–Y and B–Y). A modulation circuit 4 is adapted to modulate the amplitudes of two color subcarriers (SC1 and SC2) different from each other by 90 degrees, with the color difference signals (R–Y and B–Y) so as to combine them to generate a chromatic signal (C).

A color burst signal generation circuit 5 is adapted to generate a color burst signal (CB). This color burst signal (CB) has a given phase difference from the color subcarriers (SC1 and SC2) with the same cycle as those of these color subcarriers and is generated through every 8 or 9 cycles at a given timing in the horizontal blanking term. An addition circuit 6 adds the chromatic signal (C) and brightness signal (Y) to the color burst signal (CB) and a composite synchronizing signal (CS) supplied from a synchronizing signal generation circuit 7, which will be described later, to generate an image signal (Y2) according to a television system. The synchronizing signal generation circuit 7 generates various types of sync-signals according to a reference clock (CK) which has a frequency defined by the television system such as NTSC, PAL or SECAM. These sync-signals are then supplied to the respective units to synchronize them in operation. At the same time, the synchronizing signal generation circuit 7 generates two different color subcarriers (SC1 and SC2) from the reference clock (CK), which are in turn supplied to the modulation circuit 4.

As shown in FIG. 2, the image signal (Y2) thus generated includes continuous image data corresponding to one horizontal line for every horizontal scan cycle and also includes a color burst signal (CB) and a horizontal synchronizing signal (HD) which are inserted into a horizontal blanking term partitioning between horizontal scan cycles adjacent to each other.

In recent TV camera systems or the like, it has been considered to replace the conventional image signal processors which use analog signal processing procedure with an image signal processor that uses a digital signal processing procedure which can be more easily adjusted and provides less degradation of the image signal. In such a case, the image signal (Y1) is subjected to analog/digital (A/D) conversion at the input step such that the color component signals (R, G and B) and color difference signals (R–Y and B–Y) can be handled as digital data during the respective signal processing procedures. After a given processing procedure has been completed, the signals are subjected to digital/analog (D/A) conversion to form the image signal (Y2).

It is to be noted herein that the image signal (Y2) shown in FIG. 2 is formed by image components (including brightness and color components) and synchronizing components (including scan timing and color synchronizations) which are different from each other in terms of the range of voltage to be taken. When the signal is handled as digital data, therefore, the gradation representing the image components becomes insufficient depending on the resolution of the D/A conversion circuit. Since the image and synchronous components of the image signal (Y2) are different from each other, the range of voltage substantially assigned to the image components becomes smaller than the range of reference voltage if the maximum and minimum voltages that can be taken by the image signal (Y2) are selected as reference voltages in the D/A conversion circuit. Even if the resolution of the D/A conversion circuit is sufficient, therefore, the gradation will be reduced by a reduced range of voltage assigned to the image components.

SUMMARY OF THE INVENTION

It is therefore an object of the present invention to provide an image signal processor for treating image signals as digital data, which can make sufficient use of the resolution of the D/A conversion circuit and secure the gradation of the image signals.

According to the present invention, a given offset is provided to an image signal from the D/A conversion circuit through a horizontal blanking term into which the synchronizing components are inserted. Thus, the image components can have their range of voltage different from that of the synchronizing components at the output side of the D/A conversion circuit, even if they exhibit the same range of voltage at the input side. Therefore, the whole range of reference voltage from the maximum to minimum level in the D/A conversion circuit can be matched to the image components, thereby using the gradation capable of being represented by the D/A conversion circuit relative to the image components.

The present invention is particularly effective for color image signal processing, but may be similarly applied to monochrome image signals. Further, the present invention may be similarly applied to digital input image data.

DETAILED DESCRIPTION OF THE PREFERRED EMBODIMENTS

Figure 3:
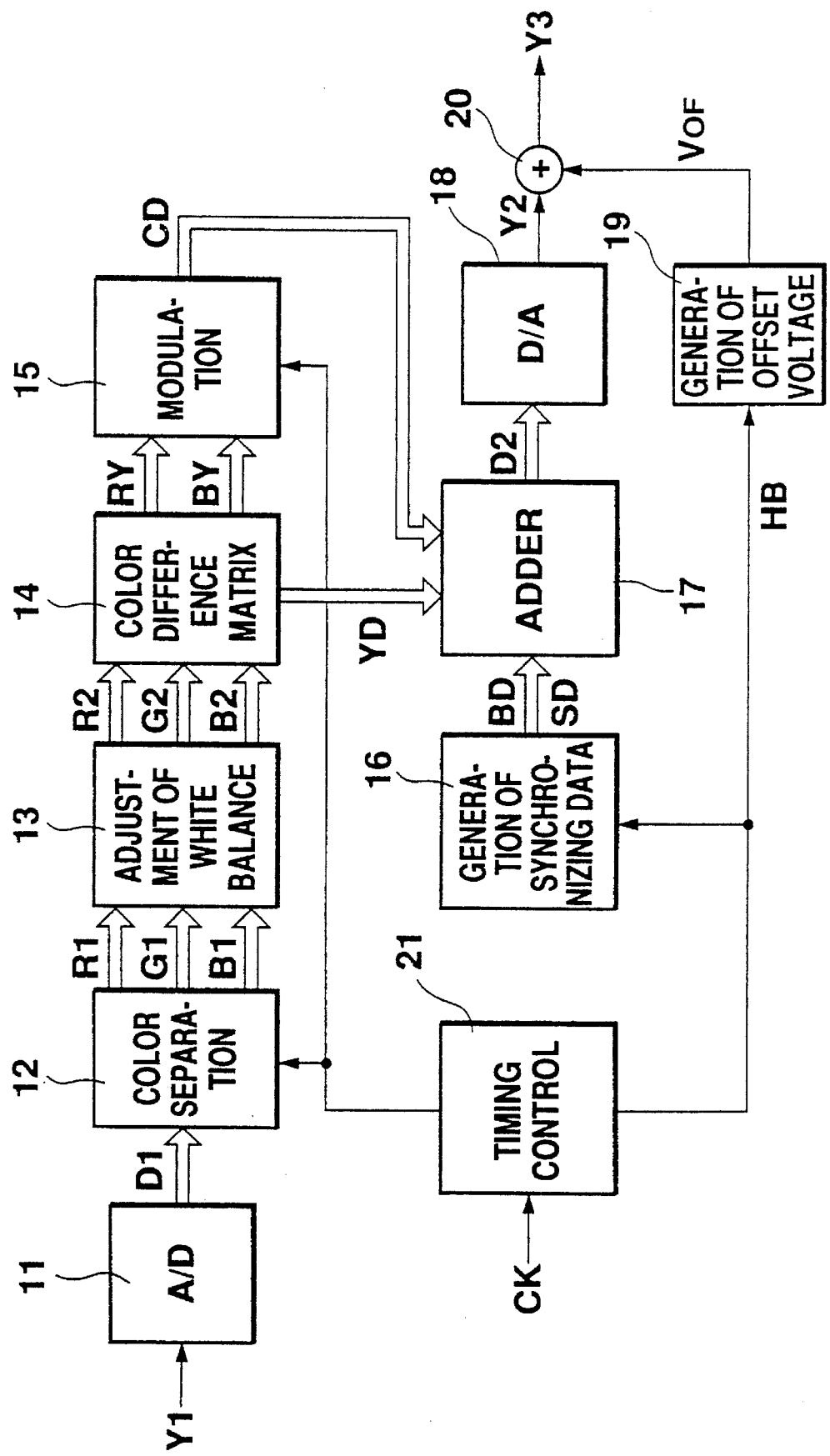
FIG. 3 is a block diagram of an image signal processor constructed in accordance with the present invention.

FIG. 3 is a block diagram of an image signal processor according to the present invention.

Figure 1:
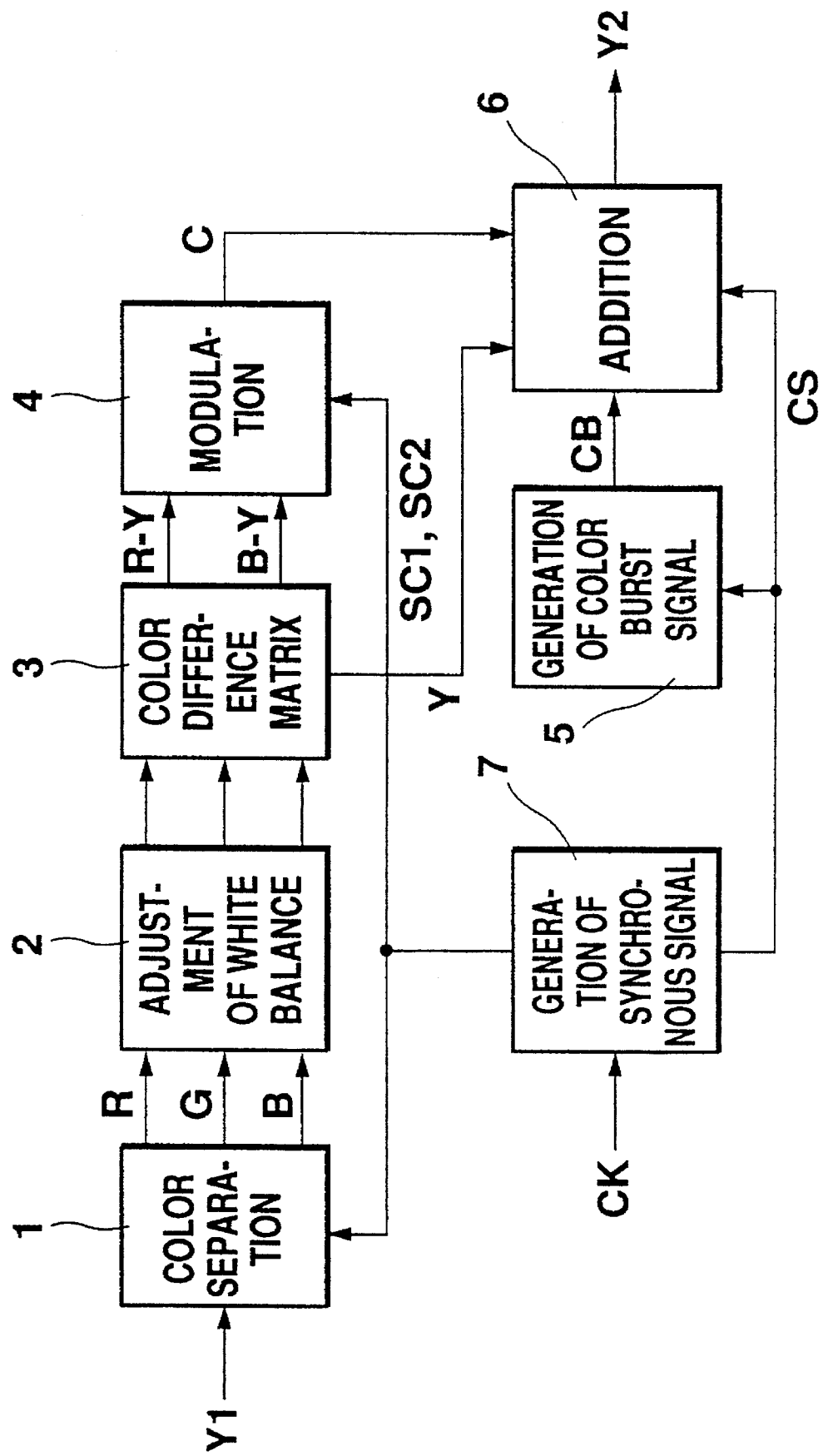
FIG. 1 is a block diagram of an image signal processor constructed in accordance with the prior art.
Figure 2:
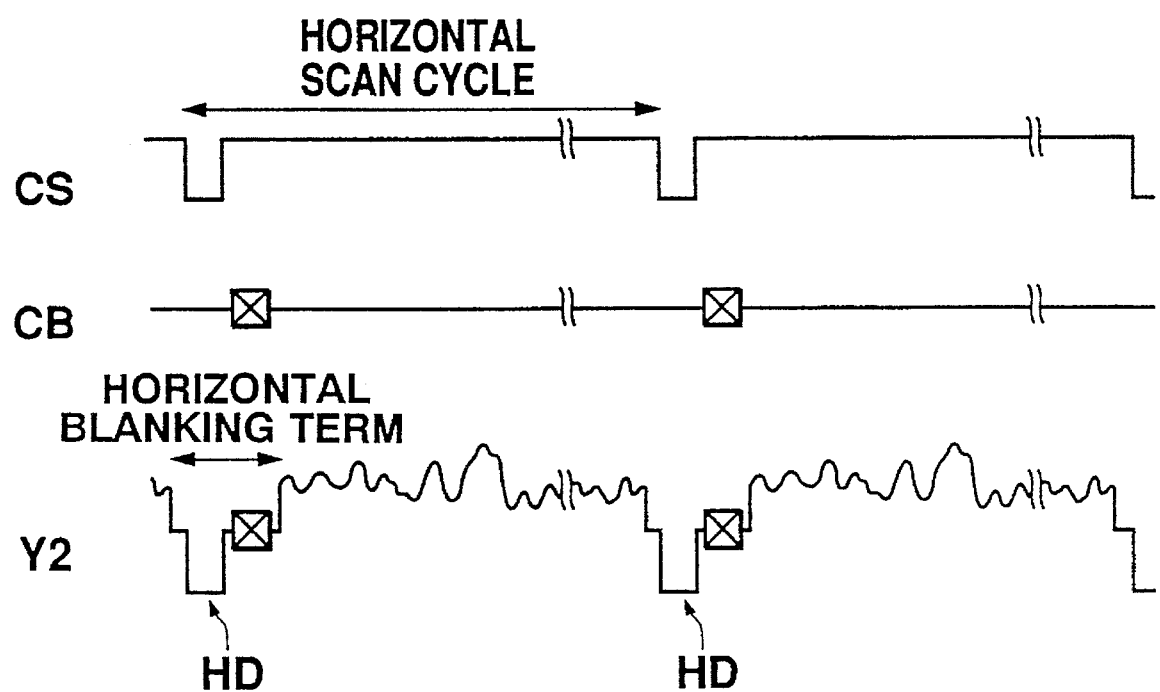
FIG. 2 is a view showing waveforms of video signals outputted from the image signal processor of the prior art.
Figure 4:
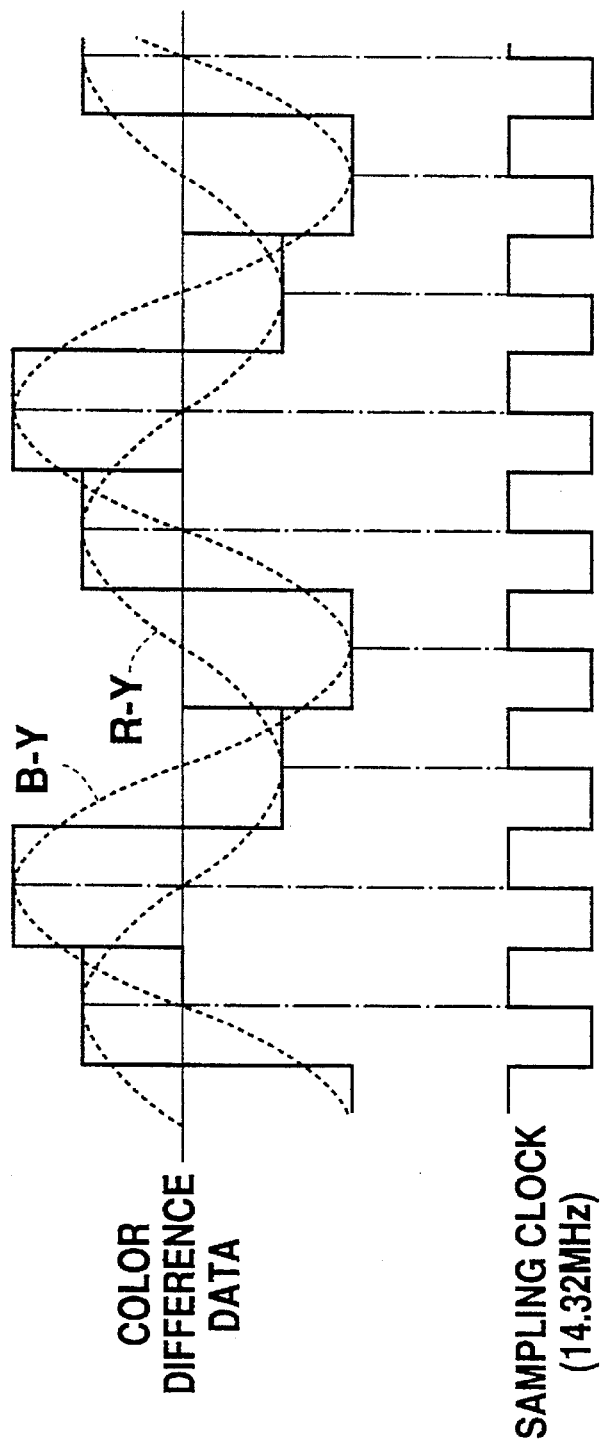
FIG. 4 is a view illustrating the operation of the modulation circuit.
Figure 5:
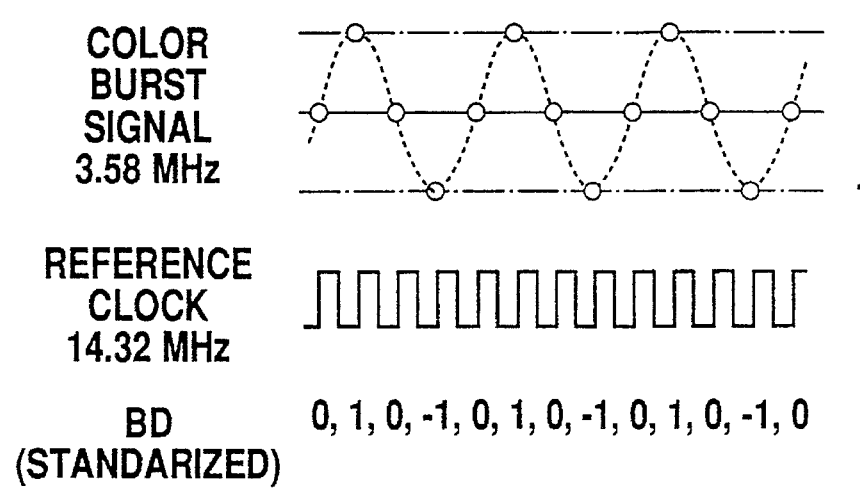
FIG. 5 is a view illustrating the operation of the color burst data generation circuit.

An A/D conversion circuit 11 is adapted to convert an image signal (Y1) into digital output image signal data (D1) for every one pixel. The image signal (Y1) is provided by the output of an image sensor as in FIG. 1 and may contain the color components of three primary colors repeated in a given sequence, for example. A color separation circuit 12 receives the image data (D1) from the A/D conversion circuit 11 and separates it into the respective color components for generating independent color component data (R1, G1 and B1). A white balance adjustment circuit 13 multiplies the color component data (R1, G1 and B1) by their inherent gain data to generate color component data (R2, G2 and B2) having an equalized average level within a given cycle. The white balance adjustment circuit 13 is feedback controlled to set the gain data such that the integrated value of color difference data (RY and BY) approximates to a given value. A color difference matrix circuit 14 fetches three types of color component data (R2, G2 and B2) subjected to the white balance adjustment to multiply them by given coefficients (R2×0.30, G2×0.59 and B2×0.11). Thereafter, these data are summed to generate brightness data (YD=0.30R2+0.59G2+0.11B2). At the same time, the color difference matrix circuit 14 subtracts the brightness data (YD) from the color component data (R2 and B2) to generate two different color difference data (RY=R2−Y and BY=B2−Y). A modulation circuit 15 causes these color difference data (RY and BY) to be subjected to the modulation to generate chromatic data (CD). Such a modulation is carried out by modulating the amplitudes of the two color subcarriers, different in phase from each other by 90 degrees, with the color difference data (R−Y and B−Y) in the normal signal processing procedure. However, the modulation will be made relative to the digitized color difference data (RY and BY) in the following manner. To perform the same procedure as in the modulation of the amplitudes of the color subcarriers, as shown in FIG. 4, the color difference data (RY) may be sampled through a sampling clock having its frequency equal to four times that of color subcarriers in a repeated sequence of (RY), 0, −(RY), 0 and (RY) as described. Similarly, the color difference data (BY) may be sampled through a sampling clock having its frequency equal to four times that of color subcarriers in a repeated sequence of 0, (BY), 0, −(BY) and 0 as described. The addition of all such sampled data can provide chromatic data (CD). In the actual process, the chromatic data (CD) can be generated by matching the sampled data of (RY), (BY), −(RY), −(BY), (RY) etc. to the color difference data (RY and BY).

A synchronizing data generation circuit 16 generates color burst data (BD) corresponding to the color sync-signals in synchronism with the chromatic data (CD). The color burst data (BD) may be formed, for example, by data repeated in a sequence of 0, 1, 0, −1, 0 according to data corresponding to sampled data which are provided by sampling color sync-signals of a frequency equal to 3.58 MHz for an NTSC system with a reference clock of frequency equal to four times 3.58 MHz, namely, a frequency equal to 14.32 MHz. The color burst data (BD) has a phase difference from that of the chromatic data (CD) and is generated by every 32–36 data at a special timing in the horizontal blanking term. The synchronizing data generation circuit 16 further generates a composite synchronizing data (SD) corresponding a composite synchronizing signal which is provided by combining the vertical and horizontal sync-signals.

Figure 6:
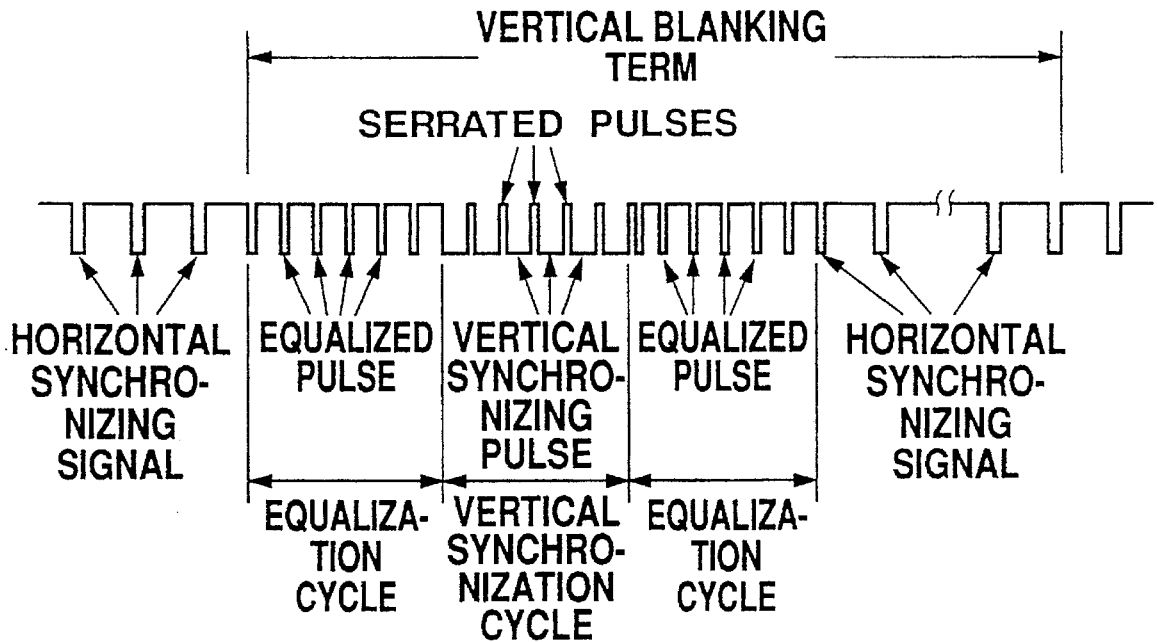
FIG. 6 is a view showing the waveform of a synchronizing signal during the vertical blanking term.

The composite synchronizing data (SD) is provided by digitizing such a composite synchronizing signal as is shown in FIG. 6. The composite synchronizing signal is represented by "0" in a period from a trailing edge to the next leading edge and by "1" in another period from a leading edge to the next trailing edge. More particularly, the composite synchronizing signal becomes "0" during a section representing the horizontal synchronizing signal and "1" during another period representing the remaining section. Within the vertical blanking term, the composite synchronizing signal becomes "0" during a section representing equivalent pulses in a cycle equal to one-half the horizontal scan and "1" during the remaining section. Within a period representing vertical synchronizing pulses in part of the vertical blanking term, the composite synchronizing signal becomes "1" during a period representing serrated pulses of the same cycle as the equivalent pulses and "0" during the remaining section.

Although these color burst data (BD) and composite synchronizing data (SD) have been described as being represented by data of 1, 0 and −1, they are actually matched to digital data of suitable bits which depend on the amplitudes of the color and composite synchronizing signals and represent the same range of voltage as can be taken by the image components.

Figure 7:
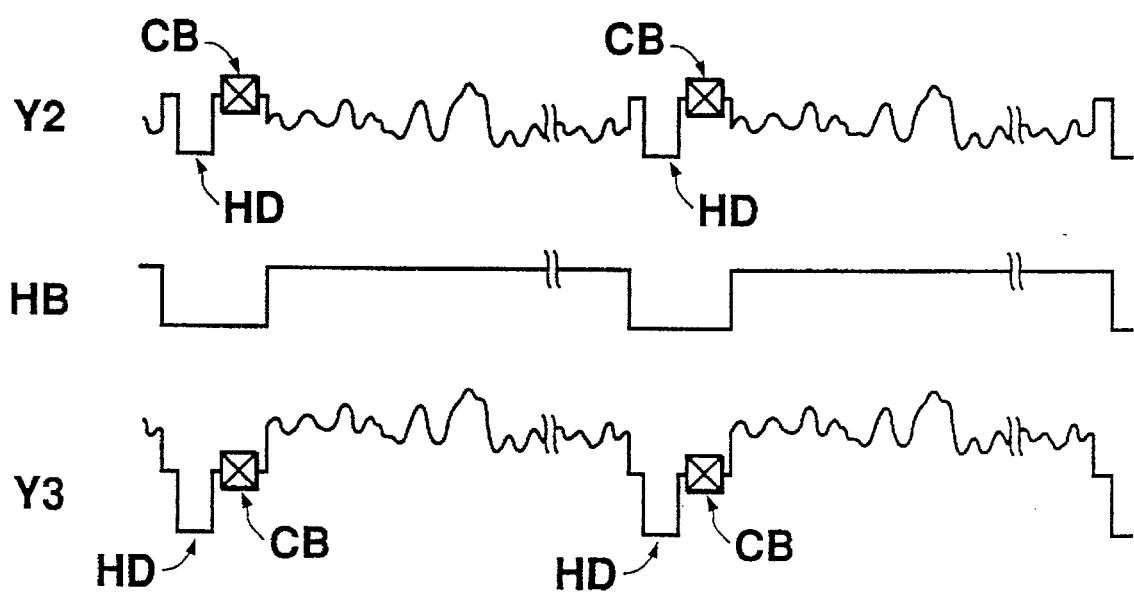
FIG. 7 is a view showing waveforms of video signals in a color image which are outputted from the image signal processor of the present invention.

An addition circuit 17 adds the brightness and chromatic data (YD, CD) to the color and composite synchronizing data (BD, SD) to generate image data (D2). A D/A conversion circuit 18 sequentially converts the image data into analog values to form an output image signal (Y2). The image signal (Y2) from the D/A conversion circuit 18 has the color burst signal (CB) corresponding to the color burst data (BD) and the horizontal synchronizing signal (HD) corresponding to the composite synchronizing data (SD) all of which are represented substantially by the same range of voltage as in the image components, as shown in FIG. 7. An offset voltage generation circuit 19 is responsive to a horizontal blanking signal (HB) from a timing control circuit 21, which will be described later, to generate an offset voltage $V_{OF}$ (negative voltage) concurrent with the horizontal blanking term of the image signal (Y2), such an offset voltage then being applied to a voltage addition circuit 20. The voltage addition circuit 20 adds the offset voltage $V_{OF}$ to the horizontal blanking term of the image signal (Y2) to form an output image signal (Y3) whose color and horizontal synchronizing signals (CB, HD) are represented by a range of voltage lower than that of the image components, as shown in FIG. 7. However, a positive offset voltage may be added to a cycle other than the horizontal trace line cycle of the image signal (Y2), rather than the addition of the negative offset voltage to the horizontal trace line cycle.

The timing control circuit 21 generates various types of timing signals based on a reference clock (CK) which has its frequency defined by the television system used. These timing signals are supplied to the respective units to synchronize the color separation circuit 12, modulation circuit 15, synchronizing data generation circuit 16 and offset voltage generation circuit 19 during operation. For example, the timing control circuit 21 may provide a horizontal scan cycle timing signal to the synchronizing data generation circuit 16 produce data for every horizontal blanking term. The timing control circuit 21 also generates and provides horizontal and vertical scan synchronizing signals to the image sensor such that the scan timing of the image sensor will be synchronized with the operations of the respective units. Thus, the image signal (Y1) inputted into the A/D conversion circuit 11 will be synchronized with the operations of the respective units to process the signals at an appropriate timing.

Although the above embodiment has been described as to the output side D/A conversion circuit 18 which is of voltage type, the D/A conversion circuit 18 may be replaced by another D/A conversion circuit which is of current type such as current addition or the like. In such a case, the offset voltage generation circuit 19 may be replaced by a source of constant current while the voltage addition circuit 20 may be replaced by a current addition circuit.

If the image signal (Y1) inputted into the A/D conversion circuit 11 represents a monochrome image, the white balance adjustment and modulation are not required while the color burst signal (CB) is also not required. Therefore, the offset voltage $V_{OF}$ may be added as a synchronizing signal (CS).

Figure 8:
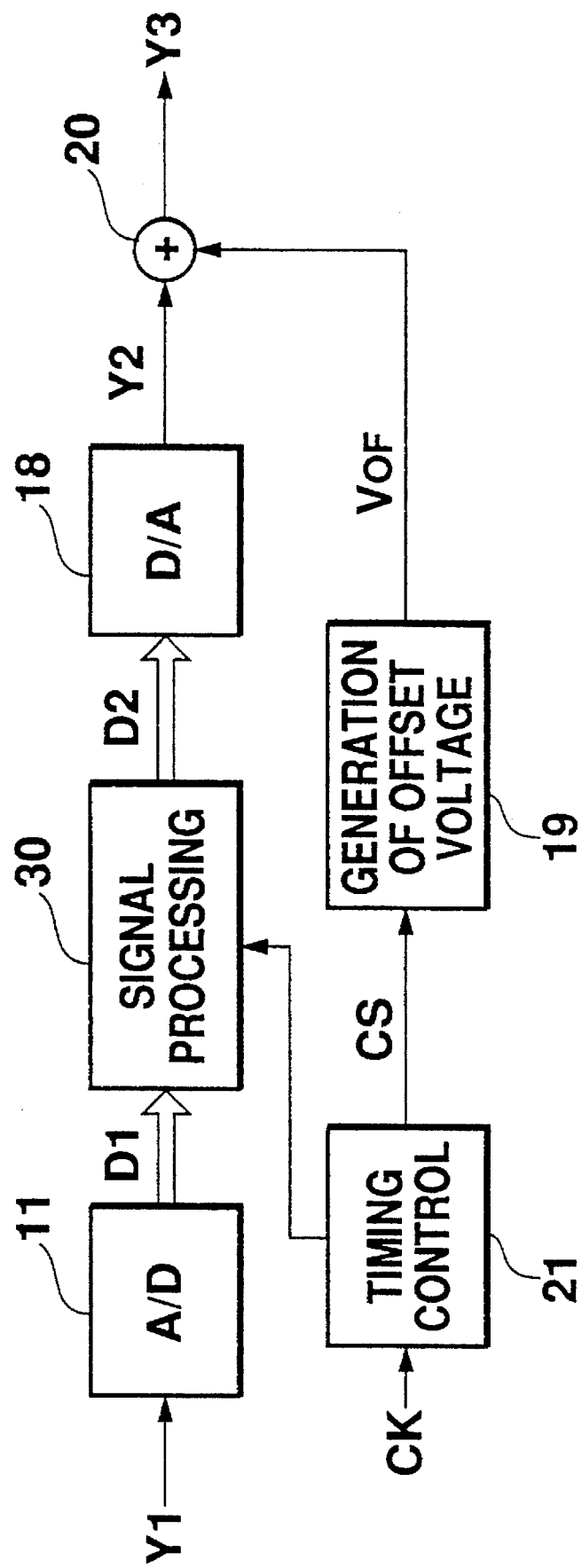
FIG. 8 is a block diagram of an image signal processor for treating the video signals of a monochrome image according to the present invention.

More particularly, as shown in FIG. 8, the A/D conversion circuit 11 converts the image signal (Y1) only comprising the brightness signal into the digital image signal (D1) which is in turn inputted into a signal processing circuit 30. The signal processing circuit 30 applies digital treatments such as contrast adjustment and others to the image data. An image signal (D2) obtained by the signal processing circuit 30 is then converted by the D/A conversion circuit 18 into an analog image signal (Y2) which is in turn inputted into an adder 20. The adder 20 has received the offset voltage $V_{OF}$ which is added to the image signal (Y2) to form an image signal (Y3) containing the horizontal synchronizing signal (HD).

Figure 9:
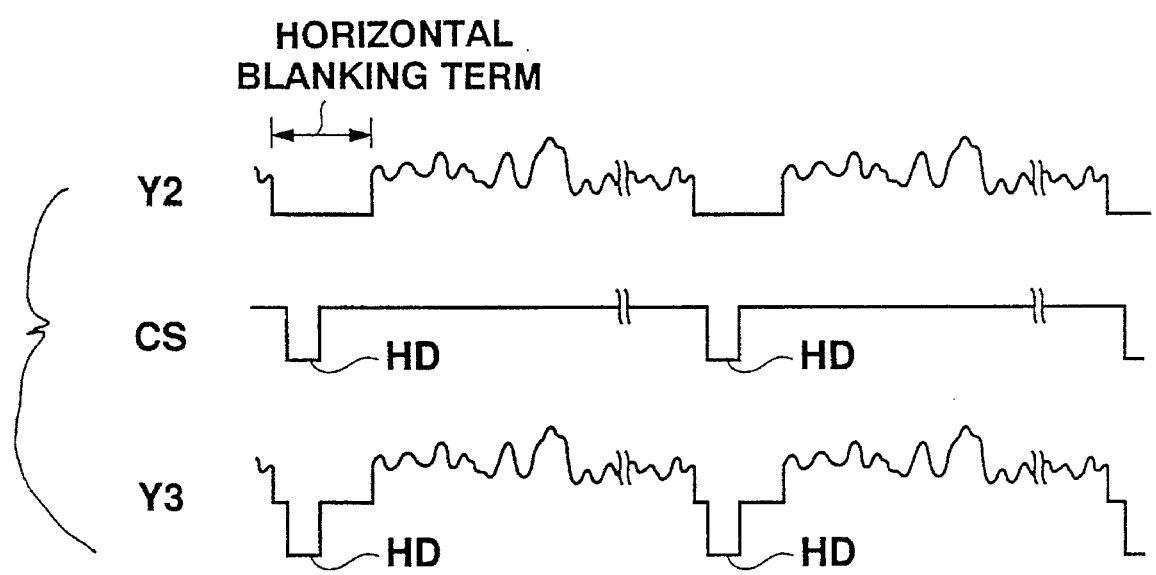
FIG. 9 is a view showing waveforms of video signals in a monochrome image which are outputted from the image signal processor of the present invention.

As shown in FIG. 9, the image signal (Y2) from the D/A conversion circuit 18 does not contain any brightness component during the horizontal blanking cycle. The timing control circuit 21 provides a horizontal synchronizing signal (CS) to the offset voltage generation circuit 19. The offset voltage generation 19 is responsive to the horizontal synchronizing signal (CS) to generate the offset voltage $V_{OF}$ used to apply the horizontal synchronizing signal (HD) to the image signal. The offset voltage $V_{OF}$ is then supplied to the adder 20 wherein it is added to the image signal (Y2) to form the image signal (Y3).

When the offset voltage generation circuit 19 is actuated by the synchronizing signal (CS) in place of the horizontal blanking signal (HB), it can provide the image signal (Y3) to which the horizontal synchronizing signal (HD) has been added.

If the voltage of the image signal (Y2) is at an unacceptable level during the horizontal blanking cycle, another offset voltage $V_{OF2}$ different from that of the horizontal synchronizing signal may be applied to the horizontal blanking cycle to adjust the voltage level during the horizontal blanking cycle.

Although the above embodiments have been described as to conversion of the image signal (Y1) from the image sensor or the like into the digital image signal (D1), the latter may be generated directly by a personal computer or the like.

According to the present invention, an offset is added to the horizontal blanking term of the image signal at the output side of the D/A conversion circuit to assign all the voltages taken out from between two reference voltages which are given by the D/A conversion circuit to the image components of the image signal. As a result, the resolution of the D/A conversion circuit can be effectively used without reduction of the gradation that can be represented by the D/A conversion circuit.

What is claimed is:

1. An image signal processor for obtaining an image signal having a given format from digital image data which comprises a given number of horizontal scanning lines defining one scene, each of the horizontal scanning lines being formed by digital data for every pixel, said processor comprising an addition circuit actuated in synchronism with a horizontal scan cycle for adding synchronizing data taking the same range as can be taken by said digital image data to said digital image data; a D/A conversion circuit for converting said digital image data with the synchronizing data added thereto into an analog value to form an offset image signal having an offset value in a horizontal blanking term; and an offset circuit for changing the offset value of the horizontal blanking term of said offset image signal.

2. An image signal processor as defined in claim 1, wherein the change of value in said offset circuit is performed by shifting the voltage value of the horizontal blanking term of the offset image signal relative to the offset image signal in a term other than the horizontal blanking term, thereby providing a synchronizing signal having a predetermined voltage value.

3. An image signal processor for processing an image signal including a given number of horizontal scanning lines which define one scene, comprising an A/D conversion circuit for converting a first input image signal into digital data according to a given sampling clock to provide a first image data; a color separation circuit for separating said image data into color components to provide a plurality of color component data; a matrix circuit for processing said plurality of color component data to generate brightness data and two types of color difference data; a modulation circuit for multiplying said color difference data by color subcarrier data corresponding to two different color subcarriers which are different in phase from each other to form a chromatic data; an addition circuit for adding said brightness data to said chromatic data and for adding color burst data corresponding to the color burst signal of said image signal and synchronizing data taking the same range as can be taken by said first image data in synchronism with a horizontal scan cycle on a horizontal blanking term to generate second image data; a D/A conversion circuit for converting said second image data into an analog value to form a second analog image signal having an offset value of its horizontal blanking term; and an offset circuit for changing the offset value of the horizontal blanking term of said second image signal.

4. An image signal processor as defined in claim 3, wherein the change of value in said offset circuit is performed by shifting the voltage value of the horizontal blanking term of the offset image signal relative to the offset image signal in a term other than the horizontal blanking term, thereby providing a synchronizing signal having a predetermined voltage value.

5. An image signal processor for obtaining an image signal of a given format from a digital image data which comprises a given number of horizontal scanning lines defining one scene, each of the horizontal scanning lines being formed by digital data for every pixel, said processor comprising a digital processing circuit for carrying out desired signal processing on said digital image data; a D/A conversion circuit for converting the processed digital image data into an analog value to form a first image signal; and an offset circuit for superimposing a given offset voltage on a horizontal blanking term of said first image signal to add a horizontal synchronizing signal thereto, thereby providing a second image signal.

6. A method for obtaining an image signal having a given format from digital image data which comprises a given number of horizontal scanning lines defining one scene, each of the horizontal scanning lines being formed by digital data for every pixel, said method comprising the steps of;

synchronizing with a horizontal scan cycle for adding synchronizing data taking the same range as can be taken by said digital image data to said digital image data;

converting said digital image data with the synchronizing data added thereto into an analog value to form an offset image signal having an offset value in a horizontal blanking term; and changing the offset value of the horizontal blanking term of said offset image signal.

7. A method as defined in claim 6, wherein the change of value in said offset circuit is performed by shifting the voltage value of the horizontal blanking term of the offset image signal relative to the offset image signal in a term other than the horizontal blanking term, thereby providing a synchronizing signal having a predetermined voltage value.

8. A method for processing an image signal including a given number of horizontal scanning lines which define one scene, said method comprising the steps of;

converting a first input image signal into digital data according to a given sampling clock to provide a first image data;

separating said image data into color components to provide a plurality of color component data;

processing said plurality of color component data to generate brightness data and two types of color difference data;

multiplying said color difference data by color subcarrier data corresponding to two different color subcarriers which are different in phase from each other to form chromatic data;

adding said brightness data to said chromatic data;

adding color burst data corresponding to the color burst signal of said image signal and synchronizing data taking same range as can be taken by said first image data in synchronism with a horizontal scan cycle on a horizontal blanking term to generate second image data;

converting said second image data into an analog value to form a second analog image signal having an offset value of its horizontal blanking term; and changing the offset value of the horizontal blanking term of said second image signal.

9. A method as defined in claim 8, wherein the change of value in said offset circuit is performed by shifting the voltage value of the horizontal blanking term of the offset image signal relative to the offset image signal in a term other than the horizontal blanking term, thereby providing a synchronizing signal having a predetermined voltage value.

* * * * *